Patented May 18, 1926.

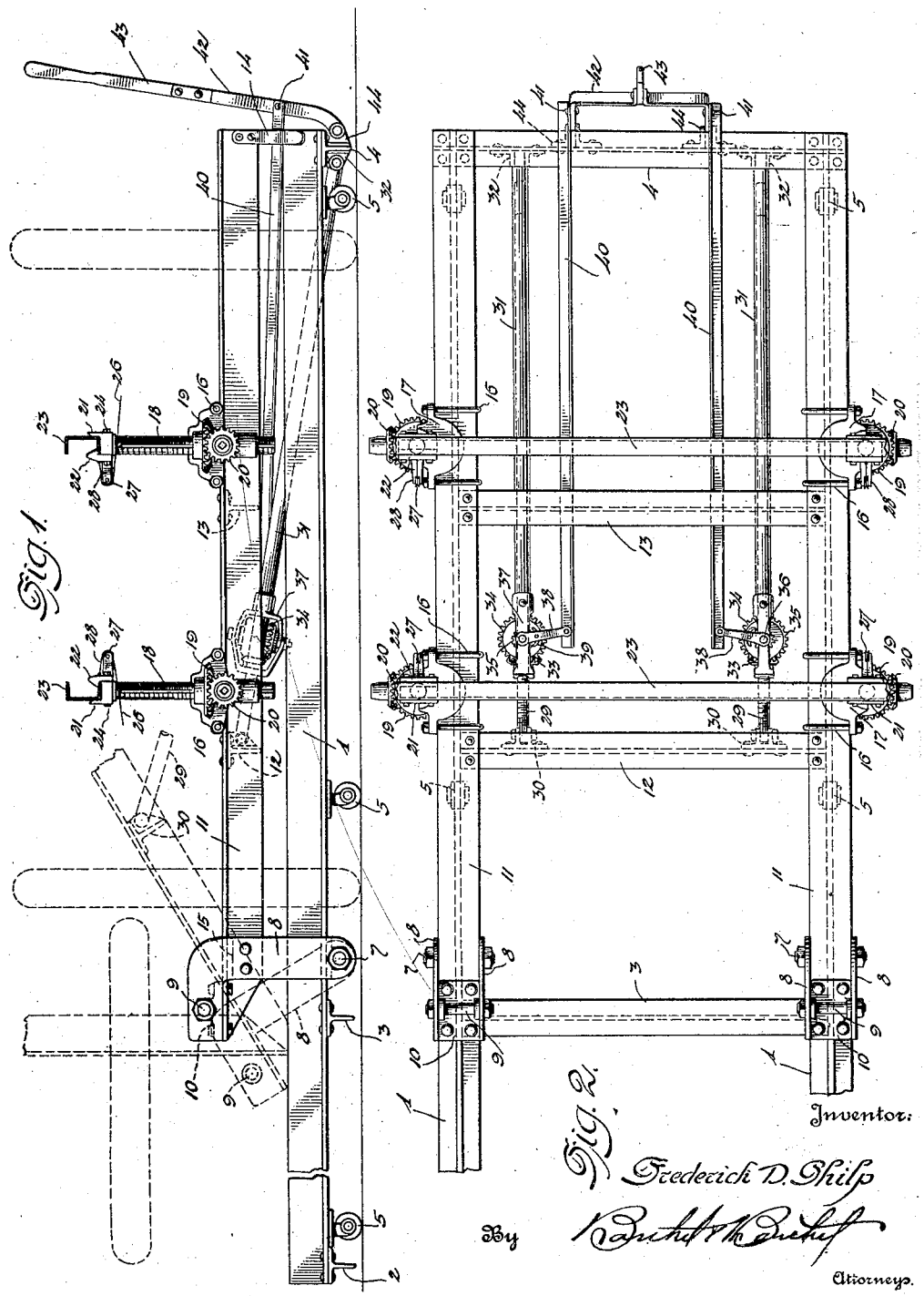

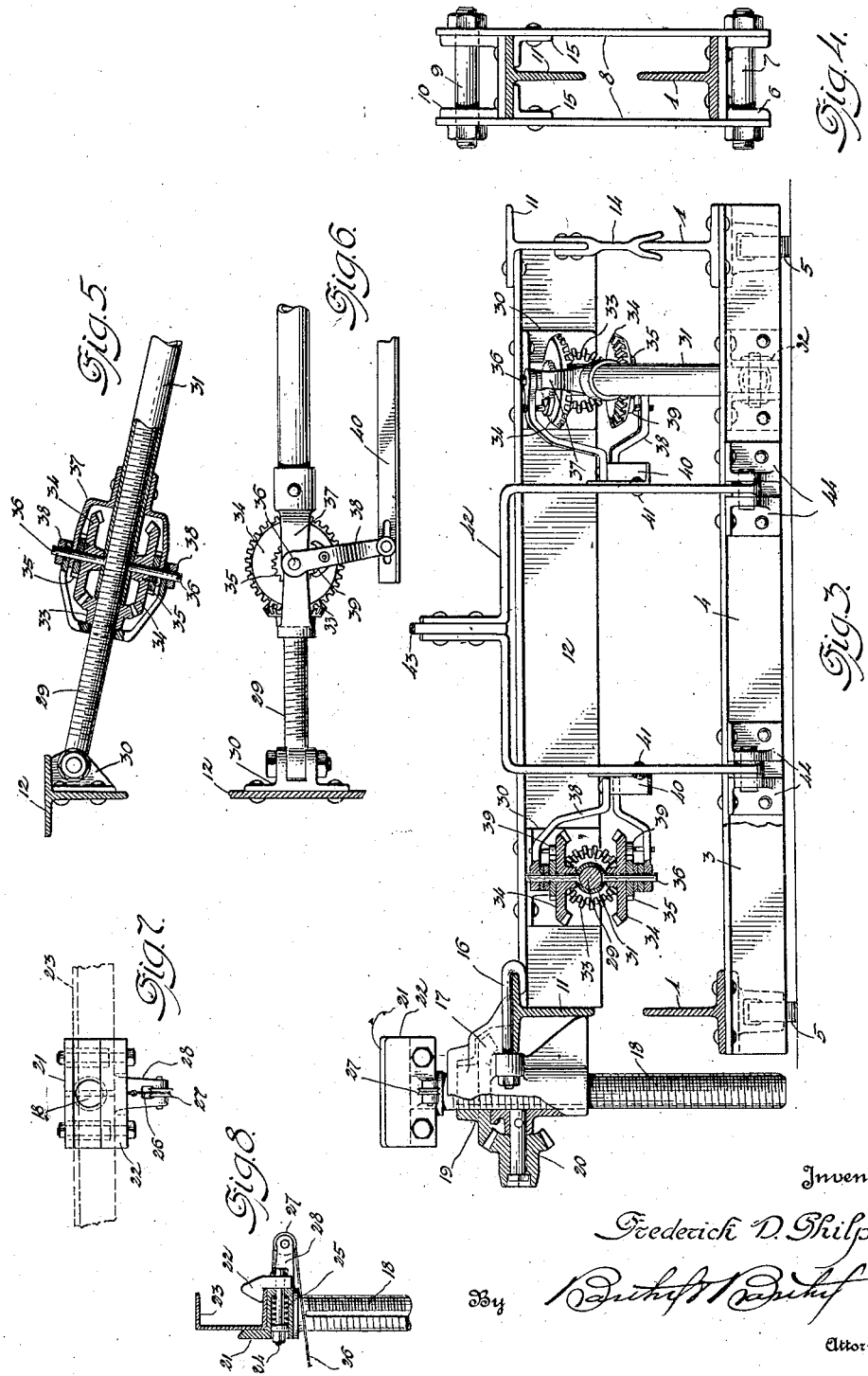

1,585,559

UNITED STATES PATENT OFFICE.

FREDERICK D. PHILP, OF ROYAL OAK, MICHIGAN.

AUTOMOBILE TILTING APPARATUS.

Application filed January 11, 1926. Serial No. 80,454.

This invention relates to an automobile tilting apparatus that may be advantageously used in garages, automobile repair shops, factories and such other places to permit of easy access being had to the under parts of an automobile or like vehicle, for lubricating, repairing, cleaning or other purposes.

My invention aims to provide a tilting device that may be easily and quickly placed under an automobile and in engagement with the chassis thereof to tilt the automobile side wise so that the underside of the automobile will be exposed and may be readily operated upon. Gripping the chassis of an automobile is in contradistinction to that class of tilting devices which grip the wheels or axles, or necessitate placing an automobile on devices adapted to be raised and tilted.

My invention further aims to provide a truck-like tilting apparatus that may be safely used for bodily placing an automobile at an angle to the horizontal, the device including a plurality of jacks automatically engageable with an automobile chassis and adapted to bodily raise the automobile off the ground or a supporting surface. The jacks are carried by a tiltable frame and other jacks of a novel design are employed for safely manipulating the frame.

In constructing my apparatus I aim to utilize structural shapes and parts of a conventional form so that the greater part of the apparatus may be manufactured at a comparatively small cost. The various parts will be hereinafter specifically described and then claimed, and reference will now be had to the drawings, wherein.

Figure 1 is a side elevation of the apparatus, partly broken away, and showing the tiltable frame in two positions which it may assume in one of which positions the frame is shown by dotted lines;

Fig. 2 is a plan of the apparatus;

Fig. 3 is an enlarged vertical elevation of a portion of the apparatus, partly broken away and partly in section;

Fig. 4 is a cross sectional view of a portion of the apparatus showing one of the hinge connections for the tiltable frame;

Fig. 5 is a detail sectional view of ratchet gearing forming part of one of the tilting jacks;

Fig. 6 is a plan of the same;

Fig. 7 is a plan of a chassis gripping device forming part of an elevating jack;

Fig. 8 is an elevation of the gripping device partly in section.

The automobile tilting apparatus includes a truck of greater length than the width of an automobile and adapted to be shifted endwise under an automobile, between the front and rear wheels thereof, so that the truck will be disposed transversely under the automobile chassis and protrude some distance fom the underside of the automobile. The truck comprises parallel T-bars having the lateral flanges thereof connected by transverse T-bars connecting members 2, 3 and 4. Also connected to the lateral flanges of the T-bars 1 are castors 5, some of which are adjacent the connecting members 2 and 4 with all of the castors cooperating in movably supporting the truck so that it may be readily shifted about and especially under an automobile.

Suitably attached to the bars 1 of the truck are bearings 6 for pins or nut equipped bolts 7 and pivotally mounted on said pins or bolts are bracket hinges 8 which have the upper angular ends thereof pivotally connected by bolts or pins 9 to bearings 10 on a tiltable frame, composed of parallel T-bars 11, connected by transverse connecting members 12 and 13. The bracket hinges 8 articulate one end of the tiltable frame to the truck and the opposite end of the tiltable frame is supported relative to the truck by legs 14 adapted to straddle the bars 1 of the truck, as shown at the right hand side of Fig. 3. The hinged end of the tiltable frame is constructively arranged whereby the lower pivots of the bracket hinges 8 will be as low on the truck as possible and the rear ends of the bracket hinges are adapted to impinge against the bars 1 and limit the tilting action of the bracket hinges 8, as shown by dotted lines in Fig. 1. In addition to the pins or bolts 9 supporting the tiltable frame relative to the hinge brackets 8, there are angle brackets 15 on the inner sides of the bracket 8 and when the tiltable frame is in a horizontal position the bars 11 rest on said angle brackets thus transferring part of the weight of the frame to the bracket hinges 8 until said bracket hinges are limited in their movement by the truck bars 1, at which time the tiltable frame may continue to tilt with the load of the frame sustained by the pins or bolts 9 relative to the hinge brackets 8 resting on the truck bars 1. This is somewhat of a double hinge connections for the tiltable frame on the truck and it facilitates or renders comparatively easy the operation of tilting the frame from that end of the frame opposite the hinged end thereof. This will become apparent when considering the mechanism employed for controlling the tiltable frame.

On the bars 11 of the tiltable frame are clamped or otherwise mounted, as at 16, housings 17 and reciprocable in said housings are screw jacks 18. Retained in the housing 17 in screw threaded engagement with the screw jacks 18 are beveled gear nuts 19 operatable by bevel gears 20 supported from the housing 17 and rotation of the beveled gears 20 cause the jacks to be raised or lowered relative to the housings 17. The jacks may be individually adjusted and for this purpose I may employ long wrenches or operating rods (not shown).

The jacks 18 are preferably four in number, two on each frame bar 11, and on the upper end of each jack is a chassis engaging angle head 21 supporting a yieldable beveled keeper 22 which is adapted to cooperate with the head 21 in holding an automobile chassis frame 23. The chassis frames are shown in Fig. 1 and 2 and represent part of a standard automobile adapted to be tilted sidewise by the apparatus. The yieldable keepers 23 are on nut equipped bolts 24 extending through the heads 21 and encircled by coiled expansion springs 25 within said heads. In raising the heads 21 into engagement with the chassis frames the keepers 22 may yield and then snap into engagement with the chassis frames so that said frames will be locked on the upper ends of the jacks. To release the keepers 22 cables 26 may be employed, said cables being trained about sheaves 27 supported by brackets 28 carried by the heads 21. With the cables 26 attached to the keepers 22 and extending outwardly from under the automobile the keepers can be conveniently shifted to release the jacks relative to the automobile chassis frames.

Connecting the transverse member 12 of the tiltable frame and the transverse member 4 of the truck is a set of long screw jacks, each comprising a screw 29 pivotally connected to a bracket 30 carried by the transverse member 12. The screw 29 extends into a housing 31 pivotally connected to a bracket 32 carried by the transverse member 4. On the opposite end of the housing 31 is a reversible ratchet mechanism by which the screw 29 may be adjusted relative to its housing. The reversible ratchet mechanism includes a beveled gear nut 33 on the screw 29, large beveled gears 34 meshing with the nut 33, ratchet wheels 35 fixed relative to the beveled gears 34, pins 36 and yokes 37 operatively supporting the gears 34 and the ratchet wheels 35 relative to the housing 31, and arms 38 on the pins 36 and provided with adjustable pawls 39 for engagement with the ratchet wheels 35. The pawls 39 are arranged to be adjusted so that the action of the ratchet mechanism may be reversed, that is, the arms 38 may be oscillated to operate the ratchet mechanism to distend the screw 29 relative to the housing 31, or the pawls may be set so that oscillation of the arms 38 retracts the screw 29 relative to the housing 31.

Pivotally connected to the arms 38 are reach rods or bars 40 having the outer ends thereof pivotally connected, as at 41, to the forked end 42 of an operating lever 43. This operating lever has its forked end 42 pivotally supported by brackets 44 from the connecting member 4 of the truck and by oscillating the lever 43 the ratchet mechanisms may be operated to raise or lower the tiltable frame 11. The detail construction of the reversible part of each ratchet mechanism forms no part of this invention other than contributing to a screw jack that may be advantageously used for operating the tiltable frame. With an automobile in a fully tilted position or my apparatus entirely free from an automobile the ratchet mechanisms can be set for a desired operation.

Assuming that the apparatus has been shifted under an automobile and positioned with the jacks 18 below the chassis frames 23, the jacks 18 can be operated to place the heads 21 in engagement with the chassis frames 23 and the weight of the automobile transferred to the tiltable frame. The lever 43 can then be oscillated to operate the screw jacks so that the screws 29 are distended and push the bracket hinges 8 to tilted positions on the truck. Since one end of the truck protrudes a considerable distance from the under side of the automobile there is no danger of the truck tilting because of any overhanging load of the tilted automobile above the truck. Obviously easy access may be had to the under parts of the automobile and when it is desired to lower the tiltable frame the ratchet mechanisms are adjusted for reverse action, the lever 43 oscillating to retract the screws 29, and when the automobile is in a horizontal position or the frame 11 completely lowered the keepers 22 are released and so held until the jacks 18 are lowered a sufficient distance to release the chassis frames. Then the apparatus may be withdrawn from under the automobile.

It is thought the operation and utility of my invention will be apparent without further description, and while in the drawing there is illustrated a preferred embodiment of the apparatus as now in use, it is to be understood that the structural elements are susceptible to such changes as are permissible by the appended claims.

What I claim is:—

1. In an automobile tilting apparatus, a truck adapted to be shifted under the side of an automobile between the front and rear wheels thereof, chassis gripping means adjustably supported from the truck and adapted to be adjusted to raise the automobile and transfer its weight to the truck, and a tiltable frame supporting said chassis gripping means relative to said truck and adapted to be tilted to place the automobile at an angle to the horizontal.

2. An automobile tilting apparatus as called for in claim 1, wherein said chassis gripping means includes angle heads and yieldable keepers.

3. An automobile tilting apparatus as called for in claim 1, further characterized by individual jacks attached to said tiltable frame for supporting said chassis gripping means.

4. An automobile tilting apparatus as called for in claim 1, further characterized by said tiltable frame having one side thereof hingedly connected to said truck by long bracket hinges normally disposed at right angles to said truck and frame.

5. An automobile tilting apparatus as called for in claim 1, further characterized by said tiltable frame having one side thereof hingedly connected to said truck by long bracket hinges and the opposite side connected to said truck by a set of jacks adapted to be operated in synchronism to tilt said frame.

6. An automobile tilting apparatus comprising a truck adapted to be shifted under one side of the automobile between the front and rear wheels thereof to protrude from the opposite side of the automobile, a tiltable frame hingedly connected to that end of said truck which protrudes from under the automobile means operatable at the sides of said frame adapted for attaching said frame to the chassis of the automobile, and means operatable at the opposite end of said truck adapted for tilting said frame to sidewise place said automobile at an angle to the horizontal.

7. An automobile apparatus as called for in claim 6, wherein the first mentioned means includes jacks on said frame automatically attachable to the automobile chassis.

8. An automobile tilting apparatus as called for in claim 6, wherein the first mentioned means includes jacks on said frame automatically attachable to the automobile chassis and manually releasable at an outer side of the automobile.

9. An automobile tilting apparatus comprising a truck, a tiltable frame above said truck, hinges connecting one end of said frame to said truck, said frame and hinges being movable in synchronism for an initial tilting action and said frame being movable relative to said hinges for a further tilting action, and means carried by said truck and connected to said frame and adapted for tilting said frame.

10. An automobile tilting apparatus as called for in claim 9, wherein said means includes a set of screw jacks and ratchet mechanism for operating said jacks in synchronism.

11. An automobile tilting apparatus, as called for in claim 9, further characterized by jacks on said frame adapted to engage and hold the chassis of an automobile.

12. An automobile tilting apparatus comprising a truck adapted to be shifted under one side of an automobile between the front and rear wheels thereof to protrude from the opposite side of the automobile, a tiltable frame above said truck, hinges connecting said frame to that end of said truck which protrudes from under the automobile, said frame and hinges being movable in synchronism for an initial tilting movement of said frame and said frame being movable relative to said hinges for a further tilting movement of said frame, and means operatable at the opposite end of said truck adapted for tilting said frame to sidewise place said automobile at an angle to the horizontal.

13. An automobile tilting apparatus as called for in claim 12, and jacks on said frame adapted for engagement with the automobile chassis for anchoring the automobile relative to said frame.

14. In an automobile tilting apparatus wherein an automobile is adapted to be bodily tilted, a frame adapted for attachment to the automobile, pivotally mounted hinges supporting said frame for a tilting action, said frame and hinges being movable in synchronism for an initial tilting action and said frame being movable relative to said hinges for a further tilting action, and means connected to said frame and adapted for tilting said frame.

In testimony whereof I affix my signature.

FREDERICK D. PHILP.